US012548256B2

(12) United States Patent
Yoshida

(10) Patent No.: US 12,548,256 B2
(45) Date of Patent: Feb. 10, 2026

(54) IMAGE PROCESSING APPARATUS FOR GENERATING SURFACE PROFILE OF THREE-DIMENSIONAL GEOMETRIC MODEL, CONTROL METHOD THEREFOR, AND STORAGE MEDIUM

(71) Applicant: CANON KABUSHIKI KAISHA, Tokyo (JP)

(72) Inventor: Yuto Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 261 days.

(21) Appl. No.: 18/458,942

(22) Filed: Aug. 30, 2023

(65) Prior Publication Data

US 2024/0078753 A1 Mar. 7, 2024

(30) Foreign Application Priority Data

Sep. 2, 2022 (JP) .................................. 2022-140386

(51) Int. Cl.
| | |
|---|---|
| *G06T 17/20* | (2006.01) |
| *G06T 3/40* | (2024.01) |
| *G06T 5/20* | (2006.01) |
| *G06T 5/70* | (2024.01) |

(52) U.S. Cl.
CPC ................ *G06T 17/20* (2013.01); *G06T 3/40* (2013.01); *G06T 5/20* (2013.01); *G06T 5/70* (2024.01)

(58) Field of Classification Search
CPC .................................. G06T 17/20; G06T 3/40
See application file for complete search history.

(56) References Cited

U.S. PATENT DOCUMENTS

| | | | |
|---|---|---|---|
| 2011/0007933 | A1 | 1/2011 | Lempitsky |
| 2020/0394848 | A1* | 12/2020 | Choudhary ............. G06T 19/20 |

FOREIGN PATENT DOCUMENTS

JP    H0632042 B2    2/1987

OTHER PUBLICATIONS

Preim, B., "Model-Based Visualization for Intervention Planning", AMC Subject Classification, 1998, pp. 164-178.
Zsemlye, G., "Shape Prediction from Partial Information", Oct. 2005, Diss. ETH No. 16297.

* cited by examiner

*Primary Examiner* — Matthew Salvucci
(74) *Attorney, Agent, or Firm* — Canon U.S.A., Inc. IP Division

(57) ABSTRACT

An image processing apparatus includes at least one memory configured to store instructions, and at least one processor configured to execute the stored instructions to obtain a binary volume, generate a multivalued volume by performing filter processing on the obtained binary volume, and generate a surface profile of a three-dimensional geometric model based on the generated multivalued volume.

15 Claims, 15 Drawing Sheets

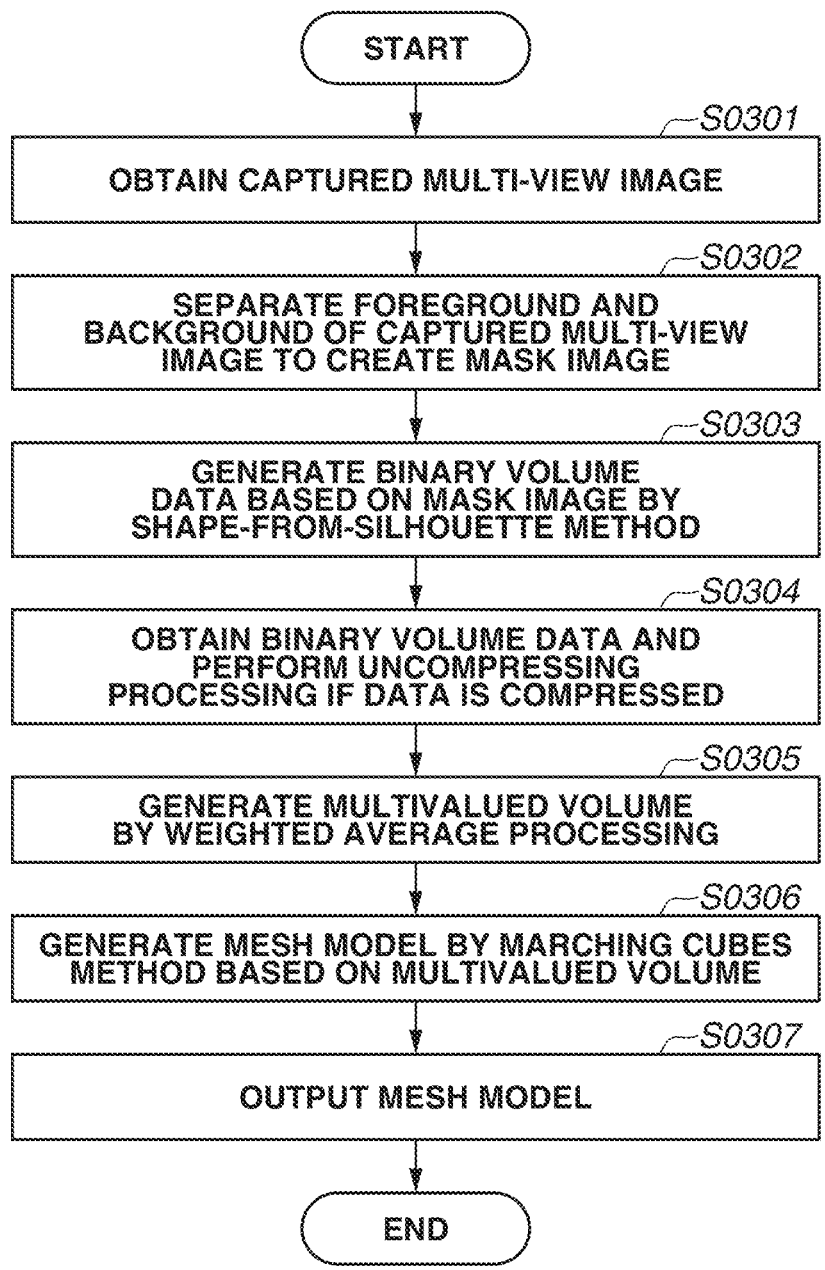

BINARY VOLUME

MULTIVALUED VOLUME

MESH MODEL

☐ OFF-VOXEL
■ ON-VOXEL

WEIGHTED AVERAGE

AVERAGE

BINARY VOLUME

MULTIVALUED VOLUME

MESH MODEL

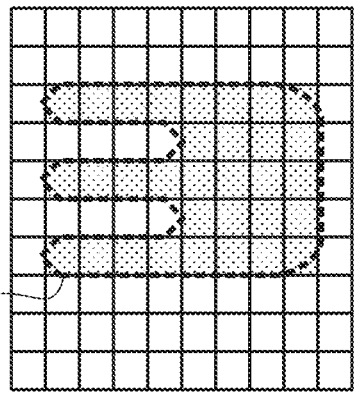
FIG. 8A BINARY VOLUME
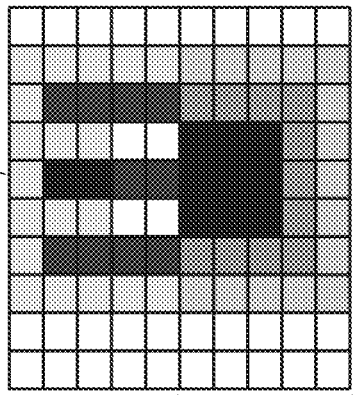
FIG. 8B COMPLEXITY
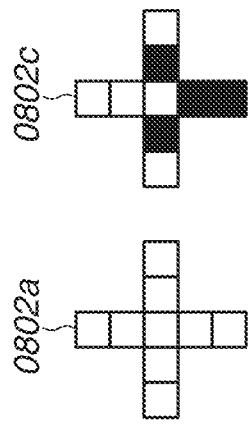
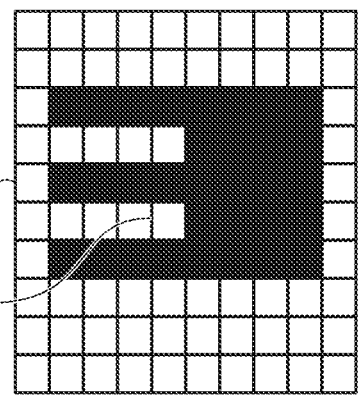
FIG. 8C MULTIVALUED VOLUME
FIG. 8D MESH MODEL

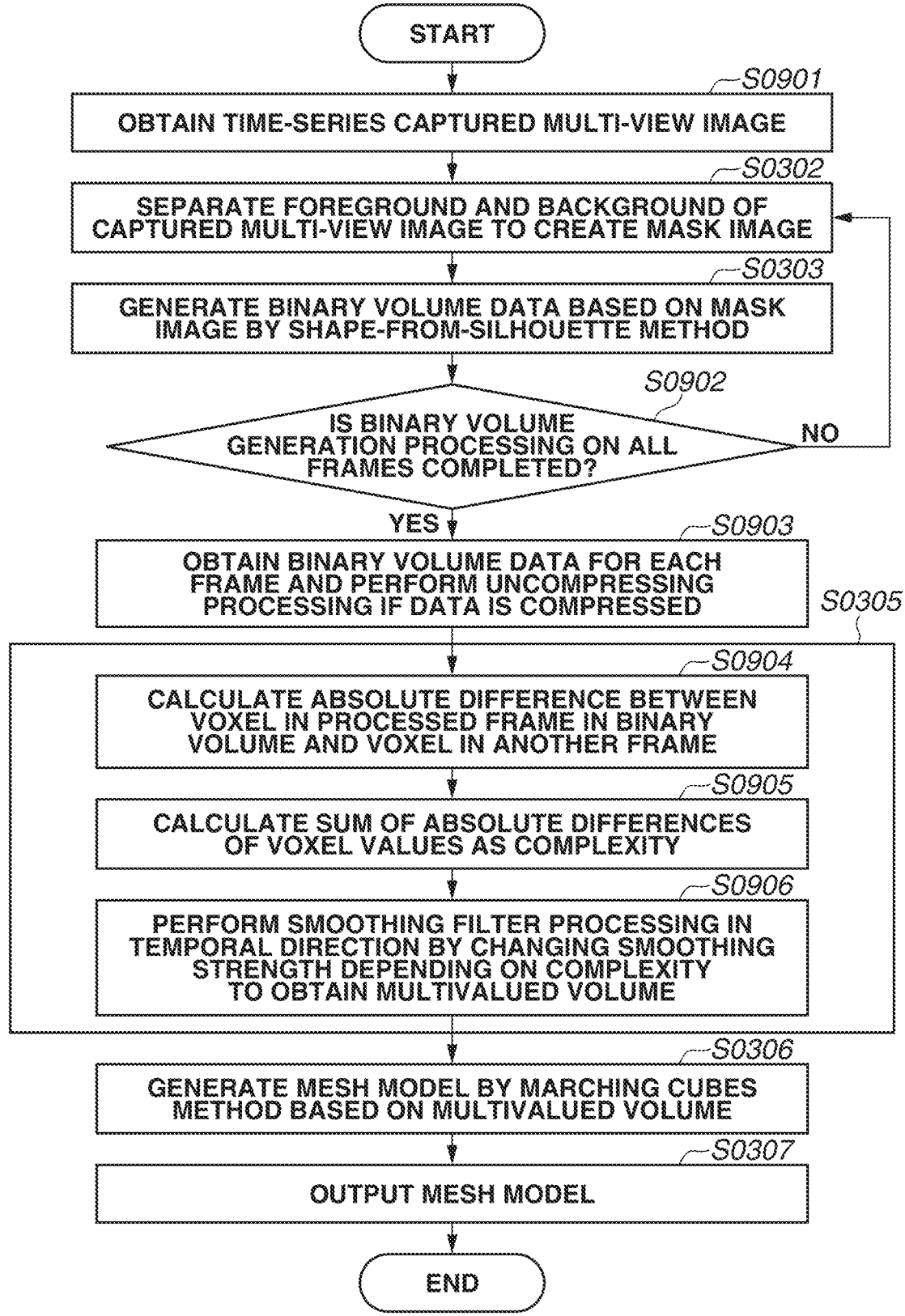

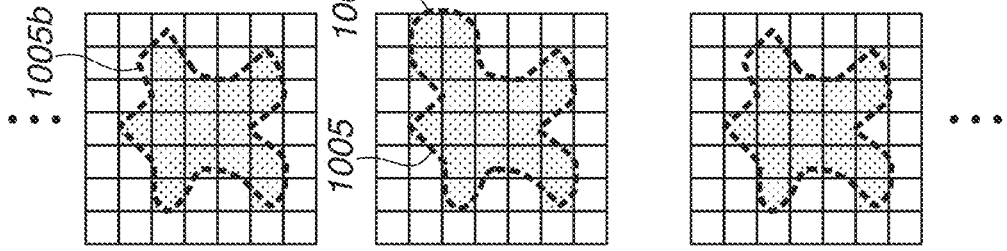
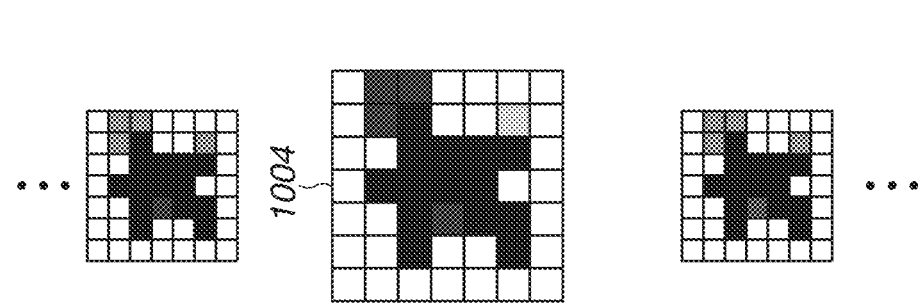
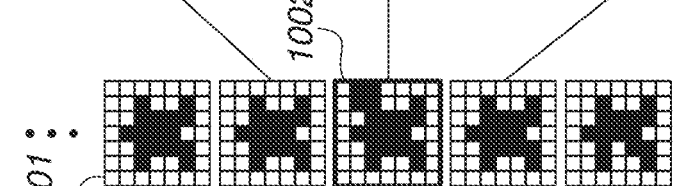
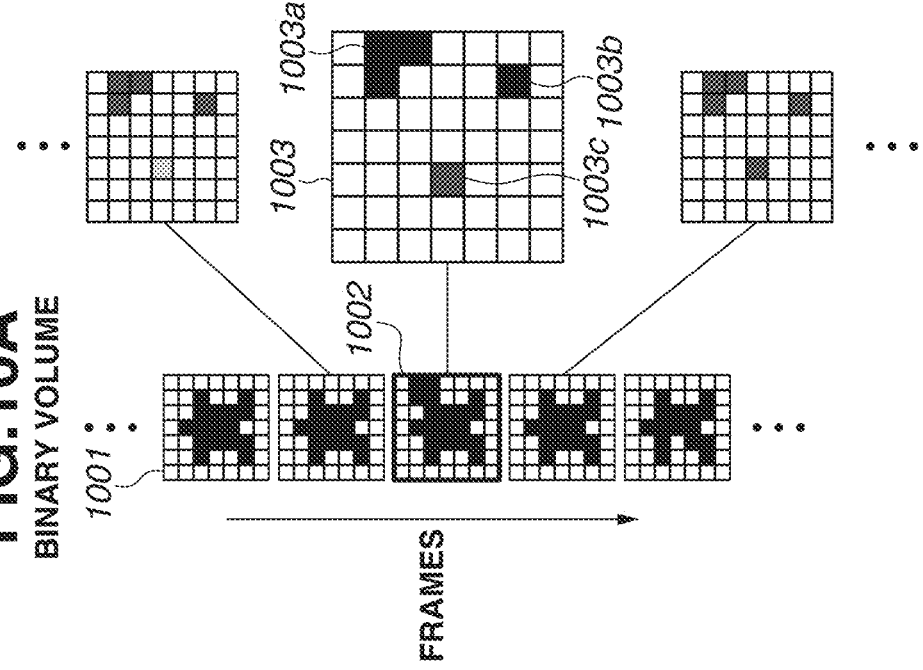

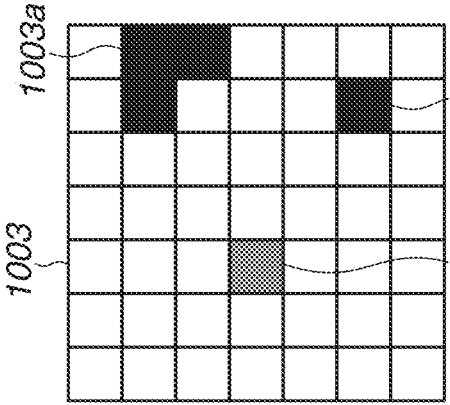
FIG. 11D MESH MODEL
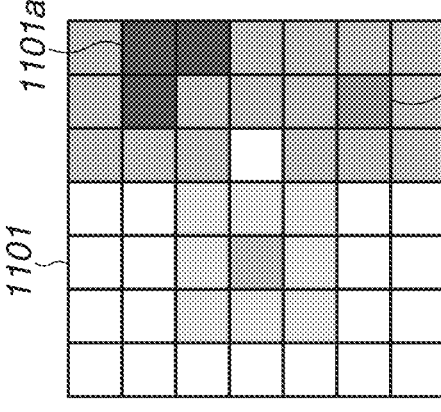
FIG. 11C MULTIVALUED VOLUME
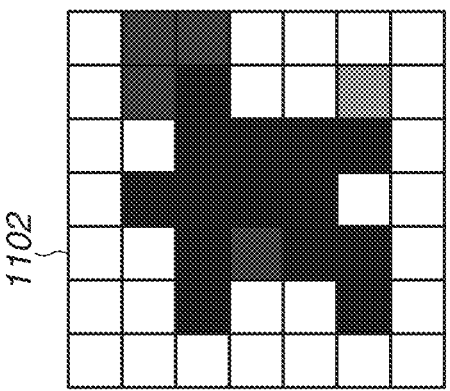
FIG. 11B LOW-PASS COMPLEXITY
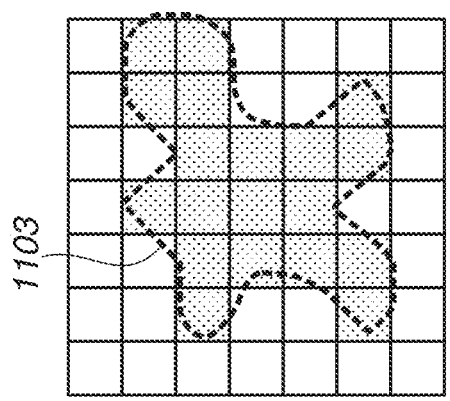
FIG. 11A COMPLEXITY

BINARY VOLUME

SPATIAL COMPLEXITY

MULTIVALUED VOLUME

TEMPORAL COMPLEXITY

SPATIOTEMPORALLY-SMOOTHED MULTIVALUED VOLUME

SURFACE PROFILE

IMAGE PROCESSING APPARATUS FOR GENERATING SURFACE PROFILE OF THREE-DIMENSIONAL GEOMETRIC MODEL, CONTROL METHOD THEREFOR, AND STORAGE MEDIUM

BACKGROUND OF THE INVENTION

Field of the Invention

The present invention relates to an image processing apparatus that generates a surface profile of a three-dimensional geometric model, a control method for the image processing apparatus and a storage medium.

Description of the Related Art

As video creation technology, there is known a volumetric video technology for generating a video image of an object from any desired viewpoint by reconstructing three-dimensional space information. In the volumetric video technology, there is a shape-from-silhouette method as a method of generating a three-dimensional geometric model of an object. In the shape-from-silhouette method, images of an object are captured from multiple viewpoints and a mask image (silhouette image) representing a silhouette of the object is obtained from the captured images by foreground/background separation processing, and then a volume is obtained based on an overlapping portion of a mask object area in the respective images. The volume thus obtained includes a binary voxel value representing the inside and outside of the object.

To further facilitate rendering of the volume, a surface profile can be generated based on the volume and the surface profile can be converted into a form such as a mesh model or a surface point group. Japanese Examined Patent Application Publication No. H06-032042 discusses a technique for generating a surface profile using a surface generation pattern with reference to a voxel value for a volume formed of a voxel grid.

However, in the technique discussed in Japanese Examined Patent Application Publication No. H06-032042, it is difficult to calculate a smooth surface profile for a binary volume obtained by the shape-from-silhouette method or the like.

SUMMARY OF THE INVENTION

According to an aspect of the present invention, an image processing apparatus includes at least one memory configured to store instructions, and at least one processor configured to execute the stored instructions, wherein the executed instructions are configured to obtain a binary volume, generate a multivalued volume by performing filter processing on the obtained binary volume, and generate a surface profile of a three-dimensional geometric model based on the generated multivalued volume.

Further features of the present invention will become apparent from the following description of embodiments with reference to the attached drawings.

BRIEF DESCRIPTION OF THE DRAWINGS

FIG. 3 is a flowchart illustrating an example of a flow of processing performed by the image processing apparatus according to the first embodiment.

FIGS. 8A to 8D each schematically illustrate a form of geometric data that varies depending on processing in the flow of processing performed by the image processing apparatus according to the second embodiment.

FIG. 9 is a flowchart illustrating a part of a flow of processing performed by an image processing apparatus according to a third embodiment.

FIGS. 10A to 10D each schematically illustrate a form of geometric data that varies depending on processing in the flow of processing performed by the image processing apparatus according to the third embodiment.

FIGS. 11A to 11D each schematically illustrate a form of geometric data that varies depending on the flow of processing performed by an image processing apparatus according to Modified Example 1 of the third embodiment.

DESCRIPTION OF THE EMBODIMENTS

Embodiments of the present disclosure will be described in detail below with reference to the attached drawings. Configurations described in the following embodiments are merely examples, and the scope of the present disclosure is not limited only to the configurations. Each embodiment of the present invention described below can be implemented solely or as a combination of a plurality of the embodiments or features thereof where necessary or where the combination of elements or features from individual embodiments in a single embodiment is beneficial.

Figure 1:
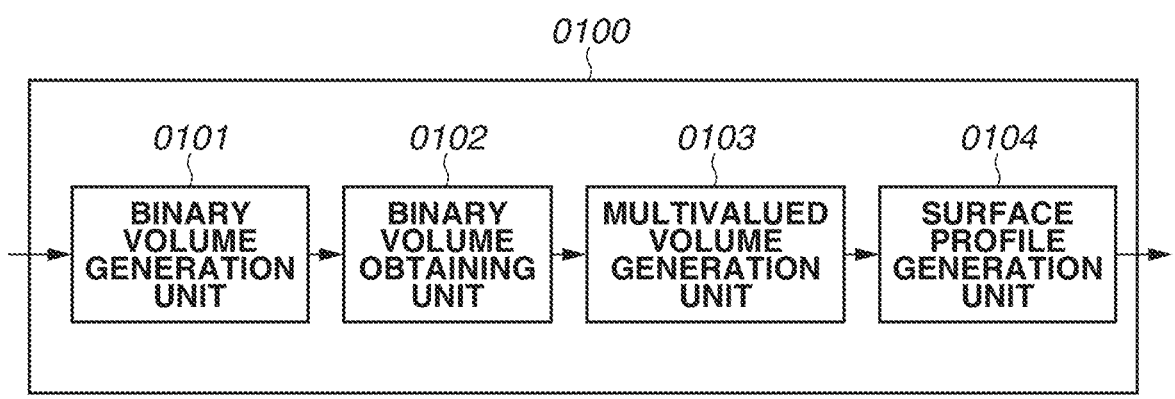
FIG. 1 is a block diagram illustrating a configuration example of an image processing apparatus according to a first embodiment.
Figure 2:
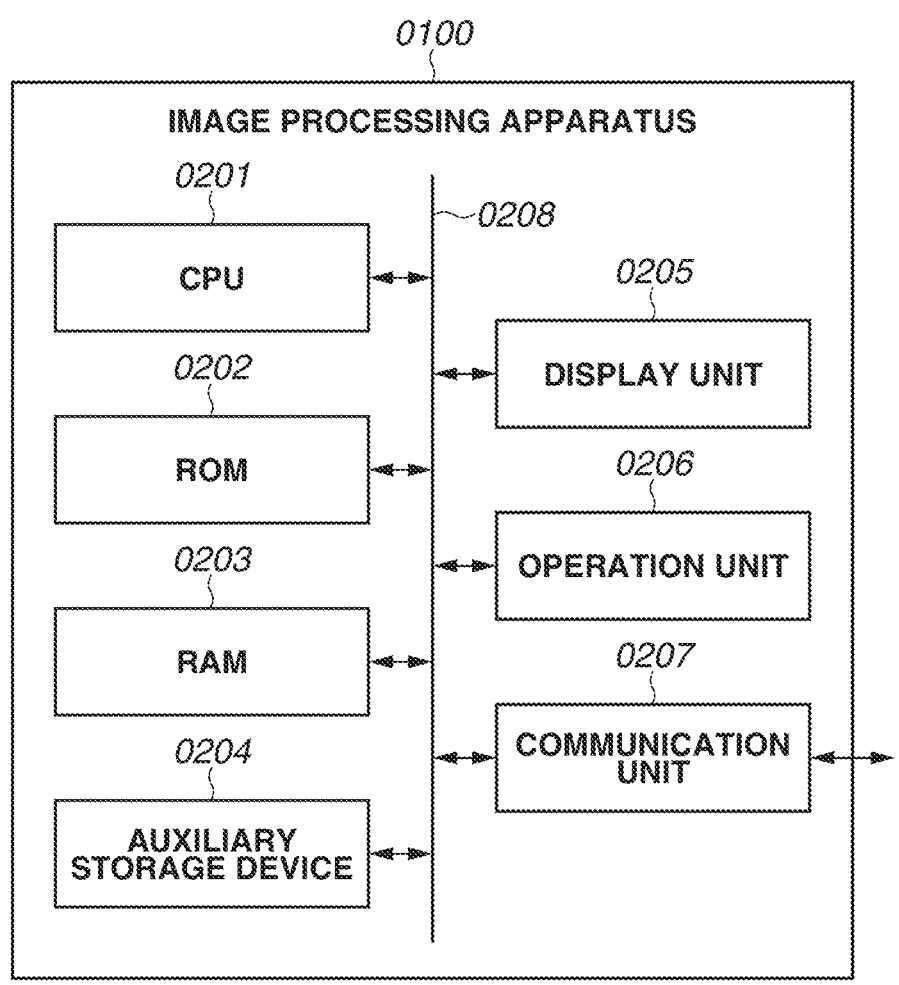
FIG. 2 is a block diagram illustrating a hardware configuration example of the image processing apparatus according to the first embodiment.

An image processing apparatus 0100 according to a first embodiment will be described with reference to FIGS. 1 and 2. First, a logical configuration of the image processing apparatus 0100 according to the first embodiment will be described with reference to FIG. 1. FIG. 1 is a block diagram illustrating a logical configuration example of the image processing apparatus 0100 according to the first embodiment. The image processing apparatus 0100 includes a binary volume generation unit 0101, a binary volume obtaining unit 0102, a multivalued volume generation unit 0103, and a surface profile generation unit 0104.

The binary volume generation unit 0101 receives captured multi-view images as an input, generates an object mask image by foreground/background separation processing, and generates a binary volume based on the mask image by a shape-from-silhouette method.

The binary volume obtaining unit 0102 obtains the binary volume generated by the binary volume generation unit 0101.

The term "volume" used herein refers to a data representation including a plurality of unit elements that bounds bounding rectangles (also referred to as "bounding boxes") set in a three-dimensional space in a grid pattern. The unit elements are called voxels. In each voxel, data (hereinafter referred to as a "voxel value") indicating whether an object in the three-dimensional space (hereinafter simply referred to as an "object") is present is set. In the present embodiment, a voxel value is zero or a positive value, or a binary value, a multi-level value (discrete value), or a continuous value. The multi-level value may be a discrete multi-level value or a continuous multi-level value. In the present embodiment, a description is given assuming that a volume in which a binary value is set as a voxel value is referred to as a binary volume, and a volume in which a multi-level value or a continuous value is set as a voxel value is referred to as a multivalued volume. The fineness of the unit elements representing a bounding rectangle is referred to as a voxel resolution.

Specifically, the voxel resolution increases as the size of a voxel decreases, and the voxel resolution decreases as the size of a voxel increases.

In the present embodiment, a part or the entirety of the voxel in which a binary value is set and "1" is set as a voxel value is present inside the object. The voxel in which a binary value is set and "1" is set as a voxel value is hereinafter referred to as an ON-voxel. On the other hand, the entirety of the voxel in which a binary value is set and "0" (zero) is set as a voxel value is not present inside the object. That is, the entirety of the voxel is present outside the object. The voxel in which a binary value is set and "0" (zero) is set as a voxel value is hereinafter referred to as an OFF-voxel.

The multivalued volume generation unit 0103 calculates a weighted average value by performing filter processing on the binary volume obtained by the binary volume obtaining unit 0102, and generates a multivalued volume depending on the shape of the binary volume.

The surface profile generation unit 0104 generates a mesh model as a surface profile based on the multivalued volume generated by the multivalued volume generation unit 0103. The surface profile generation unit 0104 outputs the generated mesh model to an external apparatus.

Processing to be performed by each unit included in the image processing apparatus 0100 is implemented by hardware such as an application-specific integrated circuit (ASIC) incorporated in the image processing apparatus 0100. Processing to be performed by each unit included in the image processing apparatus 0100 may also be implemented by hardware such as a field-programmable gate array (FPGA) incorporated in the image processing apparatus 0100. The processing may also be implemented by a central processing unit (CPU) or a graphic processor unit (GPU) and software using a memory.

A hardware configuration example of the image processing apparatus 0100 when each unit included in the image processing apparatus 0100 operates as software will be described with reference to FIG. 2. FIG. 2 is a block diagram illustrating a hardware configuration example of the image processing apparatus 0100 according to the first embodiment. In this case, the image processing apparatus 0100 is constituted by a computer. As illustrated by way of example in FIG. 2, the computer includes a CPU 0201, a read-only memory (ROM) 0202, a random access memory (RAM) 0203, an auxiliary storage device 0204, a display unit 0205, an operation unit 0206, a communication unit 0207, and a bus 0208.

The CPU 0201 controls the computer using a program or data stored in the ROM 0202 or the RAM 0203, thereby causing the computer to function as each unit included in the image processing apparatus 0100 illustrated in FIG. 1. The image processing apparatus 0100 includes one or more dedicated hardware modules different from the CPU 0201, and at least a part of the processing to be performed by the CPU 0201 may be executed by the dedicated hardware modules. Examples of the dedicated hardware modules include an ASIC, an FPGA, and a digital signal processor (DSP). The ROM 0202 stores programs and the like that are not to be changed. The RAM 0203 temporarily stores programs or data supplied from the auxiliary storage device 0204, data supplied from an external apparatus via the communication unit 0207, and the like. The auxiliary storage device 0204 is constituted by, for example, a hard disk drive (HDD), and stores various data such as image data or audio data.

The display unit 0205 is constituted by, for example, a liquid crystal display or a light-emitting diode (LED), and displays a graphical user interface (GUI) or the like for a user to operate or browse the image processing apparatus 0100. The operation unit 0206 is constituted by, for example, a keyboard, a mouse, or a touch panel, and receives an operation from the user and inputs various instructions to the CPU 0201. The CPU 0201 also operates as a display control unit that controls the display unit 0205, and operates as an operation control unit that controls the operation unit 0206. The communication unit 0207 is used for the image processing apparatus 0100 to communicate with an external apparatus. For example, if the image processing apparatus 0100 is connected to the external apparatus with a wired cable, a communication cable is connected to the communication unit 0207. In a case where the image processing apparatus 0100 includes a function of performing wireless communication with the external apparatus, the communication unit 0207 includes an antenna. The bus 0208 connects the units included in the image processing apparatus 0100 to transmit information. In the first embodiment, the display unit 0205 and the operation unit 0206 are included in the image processing apparatus 0100. At least one of the display unit 0205 and the operation unit 0206 may be provided as a separate device outside the image processing apparatus 0100.

An operation of the image processing apparatus 0100 will be described with reference to FIG. 3 and FIGS. 4A to 4E. FIG. 3 is a flowchart illustrating an example of a flow of processing performed by the image processing apparatus 0100 according to the first embodiment. FIGS. 4A to 4E each schematically illustrate a form of processing to be performed on a volume by the image processing apparatus 0100 according to the first embodiment.

In step S0301, the binary volume generation unit 0101 obtains captured multi-view images. The captured multi-view images are a plurality of captured images captured from a plurality of viewpoints by a plurality of imaging apparatuses (cameras). In this case, information about imaging conditions including camera position information during image capturing and information about a lens optical axis direction are added to each captured image. If the information about imaging conditions is fixed, regardless of actual imaging conditions during image capturing, and is stored in the ROM 0202, the binary volume generation unit 0101 reads the information from the ROM 0202.

In step S0302, the binary volume generation unit 0101 separates a foreground and a background of each of the captured multi-view images obtained in step S0301, and creates a mask image (silhouette image) of an object. To identify the object and the background in foreground/background separation processing, for example, processing of detecting a difference from the background captured in advance, or processing of identifying the background color using a specific color as the background color. Further, the binary volume generation unit 0101 can separate the foreground and the background by machine learning, such as deep learning, using a trained model for determining the foreground and the background.

In step S0303, the binary volume generation unit 0101 generates a binary volume based on the mask image by the shape-from-silhouette method. Specifically, first, the binary volume generation unit 0101 projects the mask image on a predetermined voxel grid based on the mask image and the information about imaging conditions for each camera. Then, the binary volume generation unit 0101 generates the binary volume representing an object shape, assuming that the object is present in an overlapping portion between an object area of the mask image and the voxel grid.

Figure 4A:
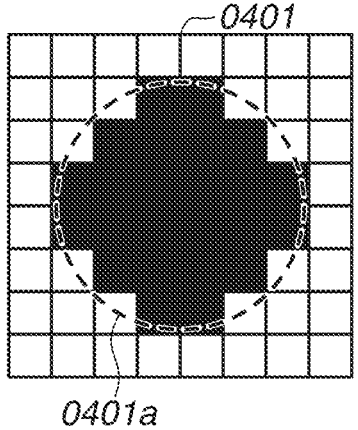
FIGS. 4A to 4E each schematically illustrate a form of geometric data that varies depending on processing in the flow of processing performed by the image processing apparatus according to the first embodiment.

In step S0304, the binary volume obtaining unit 0102 obtains a binary volume 0401 generated in step S0303. FIG. 4A illustrates the binary volume 0401. If the data format of the obtained binary volume is compressed, the binary volume generation unit 0101 performs uncompressing processing on the binary volume.

Referring to FIGS. 4A to 4E, the binary volume 0401 is represented by voxels in a two-dimensional grid. One squire in the grid illustrated in each of FIGS. 4A to 4E is actually a voxel (three-dimensional volume). FIG. 4A illustrates an object shape 0401a obtained before the volume is represented by voxels. In FIG. 4A, each voxel having a voxel center within the object shape 0401a is represented as a black voxel serving as an ON-voxel. Even when a voxel overlaps the object shape 0401a, the voxel having a voxel center located outside the object shape 0401a is an OFF-voxel. Accordingly, for example, a difference of about a half voxel is generated between the binary volume 0401 and the object shape 0401a.

Figure 4B:
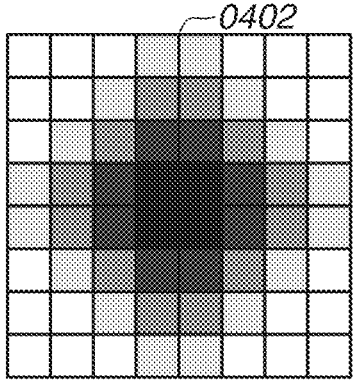
Figure 4E:
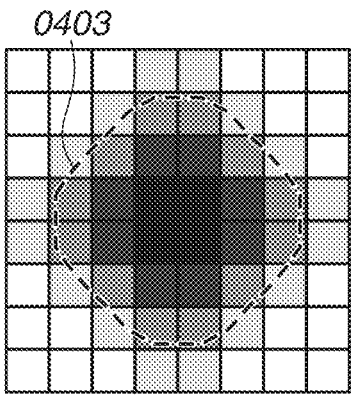
Figure 4C:
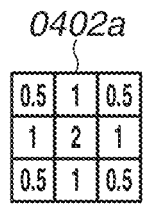

In step S0305, the multivalued volume generation unit 0103 first creates an 8-bit multivalued volume. Further, the multivalued volume generation unit 0103 allocates a voxel value of 0 (zero) to OFF-voxels and a voxel value of 255 to ON-voxels with reference to the voxel at the same coordinates as the binary volume, thereby converting the data format into multivalued data. Next, the multivalued volume generation unit 0103 generates a multivalued volume 0402b by performing filter processing represented by Equation (1) on the 8-bit multivalued volume using a weighted average filter 0402a. FIG. 4B schematically illustrates a generated multivalued volume 0402. FIG. 4C schematically illustrates the multivalued volume 0402b when the weighted average processing is performed. By the above-described procedure, the multivalued volume generation unit 0103 generates the 8-bit multivalued volume having a halftone.

$$V_m(i, j, k) = \sum_x^X \sum_y^Y \sum_z^Z V_b(i+x, j+y, k+z) * F(x-i, y-j, z-k) \quad (1)$$

In Equation (1), a voxel value $V_m(x, y, z)$ of a multivalued voxel at coordinates (i, j, k) can be obtained by convolution of a binary volume $V_b(x, y, z)$ and a filter $F(x, y, z)$. Each of X, Y, and Z represents a filter processing range in each dimensional axis direction. The weighted average filter 0402a is a 3×3 filter. In this case, X, Y, and Z satisfy $i-1 \leq X \leq i+1$, $j=1 \leq Y \leq j+1$, and $k-1 \leq Z \leq k+1$, respectively. In the present embodiment, assume that OFF-voxels are set outside a display area of the binary volume 0401.

Figure 4D:
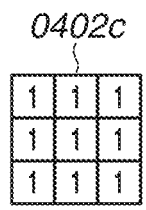

The filter processing is not limited to weighted average filter processing, but instead may be any other filter processing. For example, FIG. 4D illustrates non-weighted average filter processing. A multivalued volume 0402d is generated by performing filter processing using a non-weighted average filter 0402c. In the present embodiment, for example, the multivalued volume having 8-bit integer values is used. However, the conditions are not particularly limited. For example, in the multivalued volume, 2-bit or higher-bit voxel values may be used, or floating-type values that can be regarded as continuous values, like float type data, may be used.

In step S0306, the surface profile generation unit 0104 generates a smooth surface profile from the multivalued volume 0402 by using a marching cubes method. FIG. 4E illustrates a mesh model 0403 as an example of the smooth surface profile generated according to the present embodiment. In this case, the marching cubes method is a method in which object inside/outside determination processing for determining whether a voxel is present inside or outside an object is performed on each voxel using a predetermined threshold, and a surface profile is generated based on the inside and outside patterns. In the present embodiment, the surface profile generation unit 0104 performs the object inside/output determination processing on each voxel using a predetermined voxel value threshold $v_{TH}$ with reference to voxel values in eight (2×2×2) voxel units. Further, the surface profile generation unit 0104 determines a polygon to be generated from the inside and outside patterns of the voxels based on the object inside/outside determination. In this case, if two neighboring voxels have voxel values $v_0$ and $v_1$, respectively, which satisfy $v_0 \leq v_{TH} < v_1$, the vertices of the polygon are generated on each line connecting the centers of the two voxels. Vertex coordinates "p" of this polygon are calculated by Equation (2) using the voxel values $v_0$ and $v_1$ of the two voxels, respectively, and voxel center coordinates $p_0$ and $p_1$.

$$p = p_1 \left( \frac{1}{v_1 - v_{TH}} \right) + p_0 \left( \frac{1}{v_{TH} - v_0} \right) \quad (2)$$

In Equation (2), the density at the vertex coordinates "p" can be higher than the density at the voxel center coordinates. In other words, at least a part of the surface profile includes an area where the densities at the vertices of the surface profile determined by the surface profile generation unit 0104 are higher than the density at the voxel center coordinates. The surface profile includes an area where the resolution of the surface profile generated by the surface profile generation unit 0104 is higher than the voxel resolution. The surface profile generation unit 0104 can generate a smooth surface profile by the vertex position determination method as described above.

As described above, a smooth surface profile (i.e. the mesh model) along an isosurface of the multivalued volume is generated using the voxel values of the multivalued volume. The mesh model 0403 in FIG. 4E schematically illustrates, as an example, the surface profile in a case where threshold $v_{TH}$=3.5 is calculated in the inside/outside determination by the marching cubes method. As a filter threshold used in this case, a threshold preliminarily held and set by the image processing apparatus 0100 may be used. Alternatively, the surface profile generation unit 0104 may read out and obtain the filter threshold from the ROM 0202. In the present embodiment, for example, the mesh model is created by the marching cubes method. Instead of using the marching cubes method, a mesh model or a surface point group may be created by any other method and the created mesh model or surface point group may be used as the surface profile.

In step S0307, the surface profile generation unit 0104 outputs the generated mesh model 0403 to an external apparatus as the surface profile. If the external apparatus is a display, the mesh model 0403 is displayed on the display. If the external apparatus is a volatile memory or a storage medium such as an HDD, the mesh model 0403 is output to the memory or storage medium as data of a predetermined file format. After step S0307, the image processing apparatus 0100 terminates the processing in the flowchart of FIG. 3.

As described above, the image processing apparatus 0100 according to the first embodiment converts a binary volume into a multivalued volume by filter processing and then calculates a surface profile, thereby making it possible to generate a smooth surface profile.

Figure 5A:
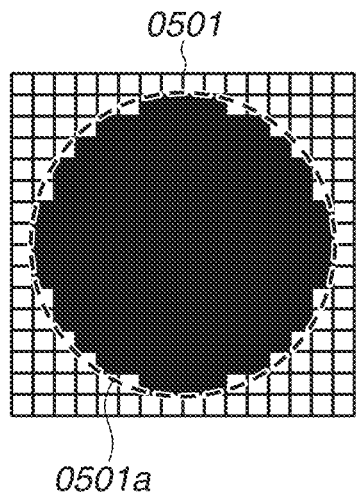
FIGS. 5A to 5C each schematically illustrate a form of geometric data that varies depending on the flow of processing including processing of changing a resolution in the image processing apparatus according to the first embodiment.
Figure 5B:
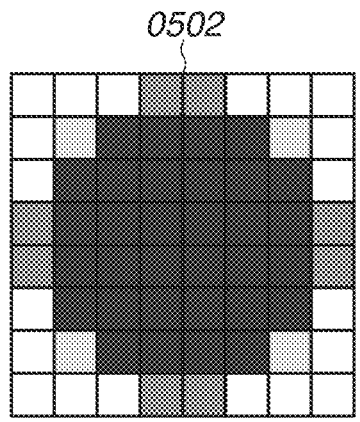
Figure 5C:
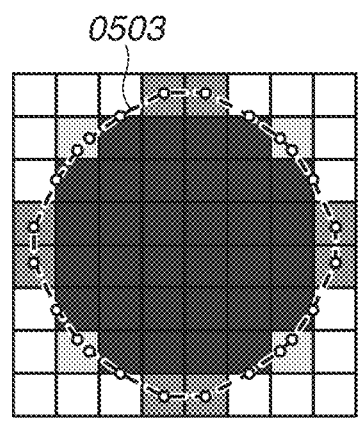

According to the present embodiment, in step S0305, the multivalued volume generation unit 0103 calculates a halftone of the multivalued volume with the same resolution as that of the binary volume by weighted average processing, but instead may generate the multivalued volume with a different resolution from that of the input binary volume. In this case, the multivalued volume generation unit 0103 calculates a halftone of the multivalued volume in the process of generating the multivalued volume with a different resolution. In other words, in this case, the multivalued volume generation unit 0103 performs processing of changing the voxel resolution by filter processing. FIGS. 5A to 5C illustrate examples of this case.

FIGS. 5A to 5C each schematically illustrate a form of a change in geometric data in the flow of processing to be executed by the image processing apparatus 0100. The multivalued volume generation unit 0103 creates a multivalued volume 0502 illustrated in FIG. 5B by reducing the resolution of a binary volume 0501 illustrated in FIG. 5A to half. The surface profile generation unit 0104 generates a mesh model 0503 illustrated in FIG. 5C by processing the multivalued volume 0502 using the marching cubes method. In this case, assume that the sum of voxel values of voxels constituting the binary volume 0501 included in each multivalued voxel corresponds to the voxel value of the multivalued volume. While FIGS. 5A to 5C each illustrate an example where the resolution is decreased, in a case where the resolution is increased, the image processing apparatus 0100 generates a multivalued volume with an increased resolution by interpolation processing, thereby creating a surface profile. This enables the image processing apparatus 0100 to generate a mesh model with any resolution even when the resolution of the binary volume is different from the resolution of the mesh model. Therefore, if the resolution of the mesh model is set to be lower than the resolution of the binary volume, the image processing apparatus 0100 can achieve higher-speed processing. On the other hand, in a case where the resolution is increased, the image processing apparatus 0100 can generate a smoother surface profile.

In the first embodiment, the image processing apparatus 0100 generates a multivalued volume from a binary volume by spatially uniform filter processing. However, for example, if an object has a complicated concavo-convex shape, ON-voxels and OFF-voxels are mixed in the binary volume. If spatially uniform smoothing processing is performed on such a binary volume, the shape of the object may be collapsed. Accordingly, in a second embodiment, complexity in a local area is calculated and a parameter for filter processing is adaptively changed based on the complexity, thereby preventing the generated object shape from collapsing even when the object has a complicated shape. The complexity will be described below.

Figure 6:
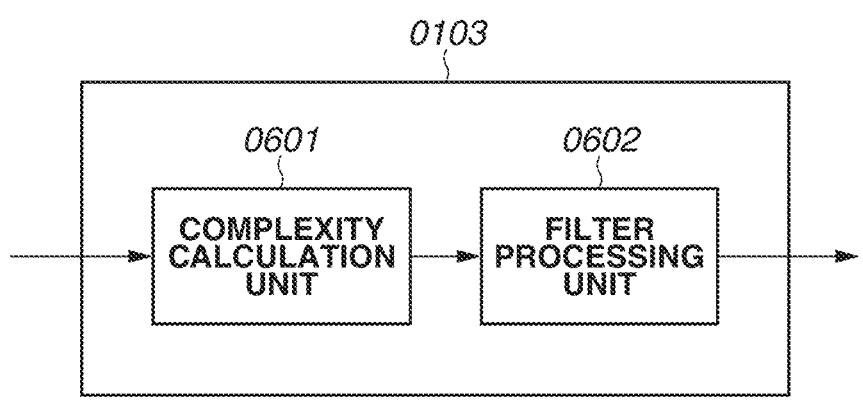
FIG. 6 is a block diagram illustrating an example of a detailed configuration of a multivalued volume generation unit according to a second embodiment.

An image processing apparatus 0100 according to the second embodiment will be described with reference to FIGS. 1 and 6. The image processing apparatus 0100 according to the second embodiment (hereinafter simply referred to as the "image processing apparatus 0100") has a configuration as illustrated in the block diagram of FIG. 1. As illustrated in FIG. 6, in the image processing apparatus 0100, a multivalued volume generation unit 0103 includes a complexity calculation unit 0601 and a filter processing unit 0602. The complexity calculation unit 0601 calculates the complexity in a spatial direction from the binary volume obtained by the binary volume obtaining unit 0102. The filter processing unit 0602 performs filter processing by adaptively changing the parameter based on the complexity, thereby generating a multivalued volume.

A binary volume generation unit 0101, a binary volume obtaining unit 0102, and a surface profile generation unit 0104 according to the second embodiment are respectively similar to the binary volume generation unit 0101, the binary volume obtaining unit 0102, and the surface profile generation unit 0104 according to the first embodiment, and thus descriptions thereof are omitted.

The complexity calculation unit 0601 calculates a fluctuation frequency of each voxel value in the spatial direction of a local area in the binary volume obtained by the binary volume obtaining unit 0102, as the complexity. A specific complexity calculation method will be described below.

The filter processing unit 0602 adaptively changes the parameter based on the complexity calculated by the complexity calculation unit 0601 and performs Gaussian filter processing on the binary volume obtained by the binary volume obtaining unit 0102, thereby generating a multivalued volume. In the present embodiment, the parameter is set such that a change in the shape due to the filter can be reduced on an area with a complicated shape. This setting prevents the generated object shape from collapsing.

Figure 7:
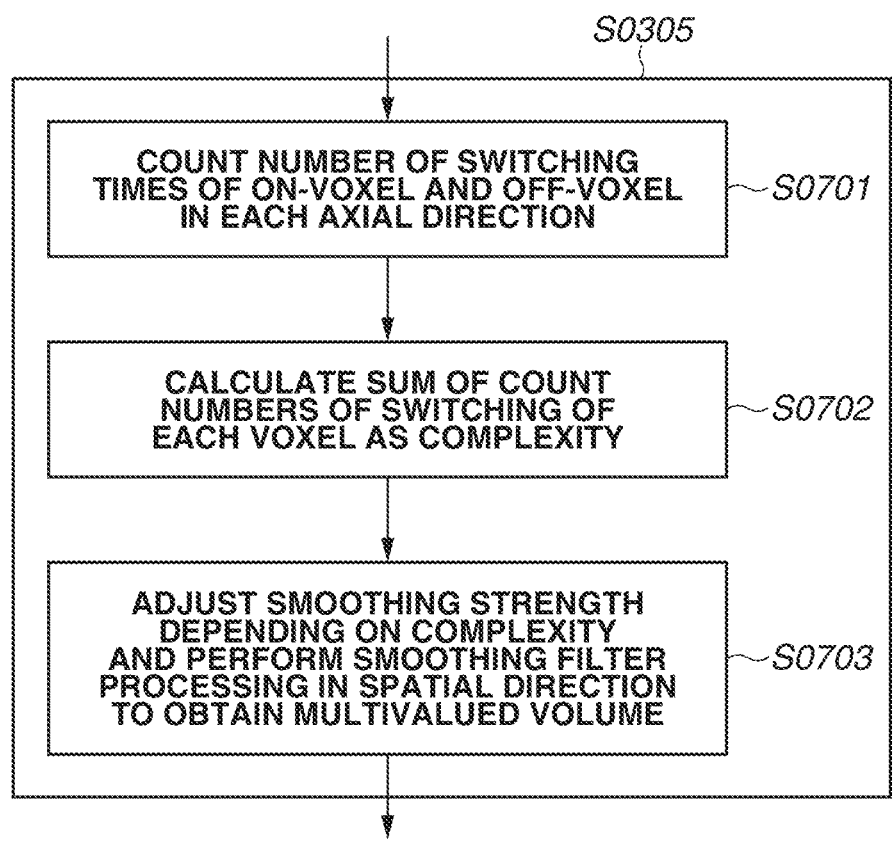
FIG. 7 is a flowchart illustrating an example of a part of a flow of processing performed by an image processing apparatus according to the second embodiment.

An operation of the image processing apparatus 100 will be described with reference to FIG. 3, FIG. 7, and FIGS. 8A to 8D. FIG. 3 illustrates a flowchart illustrating processing according to the second embodiment. The processing of steps S0301 to S0307 illustrated in FIG. 3, except the processing of step S0305, is similar to that in the first embodiment. Accordingly, the detailed description of the processing other than step S0305 is omitted. FIG. 7 is a flowchart illustrating detailed processing of step S0305 to be executed by the image processing apparatus 0100 according to the second embodiment. FIGS. 8A to 8D each schematically illustrate a form of processing to be performed on a volume by the image processing apparatus 0100 according to the second embodiment.

First, in the processing of steps S0301 to S0303, the binary volume generation unit 0101 generates a binary volume from captured multi-view images. In step S0304, the binary volume obtaining unit 0102 obtains a binary volume 0801 illustrated in FIG. 8A.

Next, in step S0701, the complexity calculation unit 0601 counts the number of switching times of the ON-voxel and the OFF-voxel on each axis for each voxel from the binary volume 0801 obtained by the binary volume obtaining unit 0102.

Next, in step S0702, the complexity calculation unit 0601 calculates the complexity by calculating the sum of the counted numbers of switching times of each voxel in all axial directions. FIG. 8B illustrates complexity 0802 as an example of the complexity calculated by the complexity calculation unit 0601. The processing of calculating complexity c by the complexity calculation unit 0601 in steps S0701 and S0702 is represented by the following Equation (3).

$$c(i, j, k) = \sum_{x}^{X} |V_b(i+x, j, k) - V_b(i+x-1, j, k)| \\ + \sum_{y}^{Y} |V_b(i, j+y, k) - V_b(i, j+y-1, k)| \\ + \sum_{z}^{Z} |V_b(i, j, k+z) - V_b(i, j, k+z-1)|$$ (3)

In Equation (3), the complexity c(i, j, k) at the coordinates (i, j, k) is calculated as the sum of absolute differences between neighboring voxels on each axis of the binary volume. Each of X, Y, and Z represents a complexity analysis range.

As an example, a description will be given of a method for calculating the complexity based on values of neighboring voxels in four directions of a voxel to be analyzed, i.e., values of two voxels located in up-and-down directions and values of two voxels located in side-to-side directions of the voxel to be analyzed, as indicated by 0802a in FIG. 8B. As described above, the complexity calculation unit 0601 uses the number of switching times of the ON-voxel and the OFF-voxel as the complexity. For example, the complexity of a voxel 0802b illustrated in FIG. 8A is calculated. First, the complexity calculation unit 0601 obtains voxel values as indicated by 0802c. In 0802c, the number of switching times of the ON-voxel and the OFF-voxel in the vertical direction is one, and the number of switching times of the ON-voxel and the OFF-voxel in the horizontal direction is four. In this case, the complexity calculation unit 0601 obtains "5" as the complexity of the voxel 0802b. In the present embodiment, the number of switching times of the binary voxel values is used as the complexity, but instead power of a specific frequency or a frequency with large power may be used as the complexity based on frequency information obtained by analyzing the frequency in the spatial direction. Yet alternatively, the sum of the absolute differences between the voxel value of a voxel to be subjected to filter processing and the voxel value of a neighboring voxel may be used as the complexity.

Next, in step S0703, the filter processing unit 0602 performs smoothing processing by adaptively changing a parameter for a Gaussian filter such that the smoothing strength is decreased in an area with higher complexity and the smoothing strength is increased in an area with lower complexity based on the complexity 0802. Thus, the filter processing unit 0602 generates a multivalued volume. FIG. 8C illustrates a multivalued volume 0803 as an example of the multivalued volume generated by the filter processing unit 0602. A three-dimensional Gaussian filter used in the present embodiment is represented by Equation (4).

$$G(x, y, z, \sigma) = \frac{1}{\sqrt{2\pi}^3 \sigma^3} \exp\left(-\frac{x^2 + y^2 + z^2}{2\sigma^2}\right)$$ (4)

In Equation (4), G(x, y, z, σ) represents the three-dimensional Gaussian filter, x, y, and z represent coordinates, and σ of the filter represents a standard deviation. In this case, the filter parameter is changed such that the standard deviation σ in Equation 4 is changed based on the complexity. For example, to adaptively change the standard deviation σ based on the complexity, the standard deviation σ is defined using the complexity c as expressed by Equation (5).

$$\sigma = \sigma_0(1-C)$$ (5)

In Equation (5), $\sigma_0$ represents a predetermined standard deviation. The complexity c is normalized in a range from 0 to 1. As the predetermined standard deviation $\sigma_0$, a standard deviation preliminarily held and set by the image processing apparatus 0100 may be used. Alternatively, the filter processing unit 0602 may read out and obtain the standard deviation from the ROM 0202. The filter processing using the filter as described above makes it possible to prevent the generated complicated shape from collapsing.

After that, a mesh mode 0804 in which the surface profile is smooth and no collapse occurs in the complicated shape as illustrated in FIG. 8D is generated from the multivalued volume 0803 by processing of step S0306. Next, in step S0307, the mesh mode 0804 is output as a surface profile. The processing of steps S0306 and S0307 is similar to that in the first embodiment, and thus descriptions thereof are omitted.

As described above, the image processing apparatus 0100 according to the second embodiment can obtain a mesh model, while preventing the complicated shape of the binary volume from collapsing.

In the second embodiment, the multivalued volume is obtained by performing adaptive smoothing processing in the spatial direction depending on the spatial complexity on the binary volume in one frame of a video image. However, if this processing is performed on a plurality of frames, a video image is obtained in which the shape of an object irregularly changes due to variations in the shape generated in each frame, which may give a feeling of incongruity to the user. In other words, a temporal change in the surface profile is not taken into consideration in the method according to the second embodiment. Since a temporal change in the surface profile is not taken into consideration, for example, a collapse may occur in a temporal change in the shape of a rapidly moving object on a video image. Accordingly, in a third embodiment, a binary volume for each of a plurality of frames is obtained and a multivalued volume is obtained by adaptive smoothing processing in a temporal direction depending on the temporal complexity. This makes it possible to generate a surface profile that temporally smoothly changes, while preventing the shape of a rapidly moving object from collapsing. An example of the processing according to the third embodiment will be described below.

An image processing apparatus 0100 according to the third embodiment will be described with reference to FIGS. 1 and 6. The image processing apparatus 0100 according to the third embodiment (hereinafter simply referred to as the "image processing apparatus 0100") has the same configuration as that of the image processing apparatus 0100 according to the second embodiment, and thus the detailed description thereof is omitted. The image processing apparatus 0100 performs the following processing. First, a binary volume generation unit 0101 obtains captured multi-view images for a plurality of frames, and generates a binary volume for each frame. Next, a binary volume obtaining unit 0102 obtains the binary volume for each of the plurality of frames, and a complexity calculation unit 0601 calculates the complexity in the temporal direction. A filter processing unit 0602 performs filter processing in the temporal direction based on the calculated complexity, thereby obtaining multivalued data.

The binary volume generation unit 0101 obtains the multi-view images for the plurality of frames, and performs processing similar to that of the binary volume generation unit 0101 according to the first embodiment on each frame, thereby generating the binary volume for each of the plurality of frames.

The binary volume obtaining unit 0102 obtains the binary volume for each of the plurality of frames, and performs uncompressing processing if the data format is compressed.

The complexity calculation unit 0601 calculates a variation in the temporal direction of each voxel of the binary volume for each of the plurality of frames obtained by the binary volume obtaining unit 0102, and sets the calculated variation as the complexity.

The filter processing unit 0602 performs Gaussian filter processing by adaptively changing the smoothing strength using the variation of each voxel value in the temporal direction in a local area obtained by the complexity calculation unit 0601 as the complexity, thereby obtaining a multivalued volume from the binary volume for each of the plurality of frames.

An operation of the image processing apparatus 0100 will be described with reference to FIG. 3, FIG. 9, and FIGS. 10A to 10D. FIG. 9 is a flowchart illustrating an example of a flow of processing performed by the image processing apparatus 0100 according to the third embodiment. FIGS. 10A to 10D each schematically illustrate a form of processing to be performed on a volume by the image processing apparatus 0100 according to the third embodiment. Detailed descriptions of processes in FIG. 9 that are denoted by the same step numbers as those in FIG. 3 are omitted.

In step S0901, the binary volume generation unit 0101 obtains captured multi-view images including a plurality of frames.

In steps S0302 and S0303, the binary volume generation unit 0101 generates a binary volume from the captured multi-view images for each frame.

In step S0902, the image processing apparatus 0100 determines whether binary volume generation processing on all frames is completed. If the processing on all frames is not completed (NO in step S0902), the processing returns to step S0302 to perform the processing on frames on which the processing is not completed. If the processing on all frames is completed (YES in step S0902), the processing proceeds to step S0903.

In step S0903, the binary volume obtaining unit 0102 obtains a binary volume 1001 for each of a plurality of frames as illustrated in FIG. 10A. If the binary volume 1001 for each of the plurality of frames is created based on data that is sampled at irregular time intervals, the binary volume obtaining unit 0102 may additionally perform resampling processing at regular intervals by interpolation processing.

In step S0904, the complexity calculation unit 0601 obtains an absolute difference between the voxel value of each voxel in a processed frame 1002 to be subjected to filter processing in the binary volume 1001 and the voxel value of the corresponding voxel located at the same location in a neighboring frame. In the present embodiment, the processed frame is a frame to be subjected to complexity analysis processing and filter processing, and the neighboring frame of the processed frame is, for example, a frame located within a range of $3\sigma_0$ based on the predetermined standard deviation $\sigma_0$ of Gaussian filter processing performed in step S0702 from the processed frame.

In step S0905, the complexity calculation unit 0601 calculates the sum of the absolute differences between the frames calculated in step S0904 as the complexity. In the present embodiment, the complexity c obtained in the processing of steps S0904 and S0905 is calculated by Equation (6). FIG. 10B schematically illustrates an example of complexity 1003 calculated by the following Equation (6).

$$c(i, j, k, n) = \sum_{t}^{T} |V_b(i, j, k, t) - V_b(i, j, k, n)| \qquad (6)$$

In Equation 6, the complexity c(i, j, k, n) represents the complexity of a frame number "n" at coordinates (x, y, z)=(i, j, k), $V_b$(i, j, k, n) represents the voxel value of the frame number "n" at coordinates (x, y, z)=(i, j, k) of the binary volume, and T represents the range of neighboring frames. In this case, the sum of absolute differences between the processed frame and the neighboring frame is used as the complexity as an example, but instead the value analyzed by another method indicated by the complexity calculation unit 0601 according to the second embodiment may be used as the complexity.

In step S0906, the filter processing unit 0602 performs Gaussian filter processing in the temporal direction on each voxel of the processed frame 1002 of the binary volume 1001, and generates a multivalued volume 1004 as illustrated in FIG. 10C. As the Gaussian filter processing in the temporal direction, smoothing processing is performed by adaptively changing the standard deviation $\sigma$ based on the complexity 1003. The standard deviation $\sigma$ to be adaptively changed can be set using the complexity 1003, like in the second embodiment. The smoothing processing in the temporal direction is not limited to a Gaussian filter, but instead smoothing processing may be performed by any other processing using a low-pass filter or the like.

After that, the image processing apparatus 0100 obtains a surface profile 1005 illustrated in FIG. 10D by processing of step S0306, and outputs the surface profile 1005 in step S0307. This processing is similar to that in the first embodiment, and thus the detailed description thereof is omitted.

As illustrated in FIG. 10D, in the surface profile 1005 generated from the multivalued volume 1004, a deformed portion 1005a in a single frame starts to deform to a deformed portion 1005b in the previous and subsequent frames. Thus, the multivalued volume is smoothed in the temporal direction, thereby generating a mesh model that temporally smoothly changes as illustrated in FIG. 10D from the binary volume illustrated in FIG. 10A.

As described above, the image processing apparatus 0100 according to the third embodiment can obtain a mesh model that temporally smoothly changes by performing filter processing in the temporal direction on the binary volume for each of the plurality of frames.

Modified Example 1 of Third Embodiment

In the third embodiment, the sum of absolute differences between the processed frame and the neighboring frame in the temporal direction is used as the complexity. However, since the complexity increases even when a voxel value in a small space changes, the smoothing strength decreases as the complexity increases, which may lead to a reduction in smoothness.

Accordingly, in Modified Example 1, the image processing apparatus 0100 performs low-pass processing in the spatial direction on the calculated complexity in order to prevent the complexity from increasing due to a change in the voxel value in a small space. Thus, the image processing apparatus 0100 performs smoothing processing on an area where the voxel values are locally changing and prevents smoothing processing from being performed on an area where the voxel values are broadly changing, thereby making it possible to prevent the shape of the generated surface profile from collapsing and to obtain a smooth shape change.

According to Modified Example 1, in step S0905 in the flowchart illustrated in FIG. 9, the complexity calculation unit 0601 performs average processing as low-pass processing on the calculated complexity, thereby implementing smoothing of the surface profile. In step S0906, the filter processing unit 0602 performs adaptive Gaussian filter processing in the temporal direction using the complexity obtained after the low-pass processing.

The image processing apparatus 0100 according to Modified Example 1 of the third embodiment will be described with reference to FIGS. 11A to 11D. FIGS. 11A to 11D each schematically illustrate a form of data in the processing to be performed by the image processing apparatus 0100 according to Modified Example 1 of the third embodiment. The processing other than processing to be performed by the complexity calculation unit 0601 is described above in the third embodiment, and thus the description thereof is omitted.

First, the complexity calculation unit 0601 calculates the complexity in the temporal direction of the binary volume obtained by the binary volume obtaining unit 0102. FIG. 11A illustrates the calculated complexity 1003. Next, the complexity calculation unit 0601 performs spatial low-pass processing on the complexity 1003, and obtains low-pass complexity 1101 as illustrated in FIG. 11B. The multivalued volume generation unit 0103 performs filter processing in the temporal direction by adaptively changing the filter parameter based on the low-pass processed complexity 1101. FIG. 11C illustrates a multivalued volume 1102 generated by the multivalued volume generation unit 0103. After that, the image processing apparatus 0100 performs the same processing as in the third embodiment, and outputs a mesh model 1103 illustrated in FIG. 11D.

The above-described processing makes it possible to reduce the complexity as indicated by a voxel 1101*b* in FIG. 11B when the voxel value varies in a spatially local area as indicated by a voxel 1003*b* in FIG. 11A.

On the other hand, if the voxel value varies in a spatially wide area as indicated by a voxel 1003*a* in FIG. 11A, the original complexity can be maintained as indicated by a voxel 1101*a* in FIG. 11B. Thus, according to Modified Example 1, it is possible to obtain a smooth surface profile in which spatially fine irregular changes are reduced by performing strong temporal smoothing on an area where voxel values are locally changing, while preventing the shape of an object from collapsing due to smoothing processing using the complexity.

In the third embodiment and Modified Example 1 of the third embodiment, a mesh model in which the shape temporally smoothly changes is created by performing temporal smoothing processing on the binary volume for each of the plurality of frames. However, it can be assumed that a spatially sufficiently smooth mesh model cannot be obtained in some cases by using only temporal smoothing processing. Accordingly, in a fourth embodiment, an image processing apparatus 0100 first analyzes the complexity in the spatial direction for each of a plurality of frames and performs adaptive spatial smoothing on the binary volume for each of the plurality of frames to obtain a multivalued volume. Next, the image processing apparatus 0100 analyzes the complexity in the temporal direction and performs adaptive temporal smoothing on the obtained multivalued volume, thereby generating a spatiotemporally-smoothed multivalued volume. Then, the image processing apparatus 0100 generates a mesh model from the spatiotemporally-smoothed multivalued volume. Thus, the image processing apparatus 0100 can obtain the mesh model in which the mesh includes a smooth surface profile for each frame and the surface profile smoothly changes as a moving image.

Figure 12:
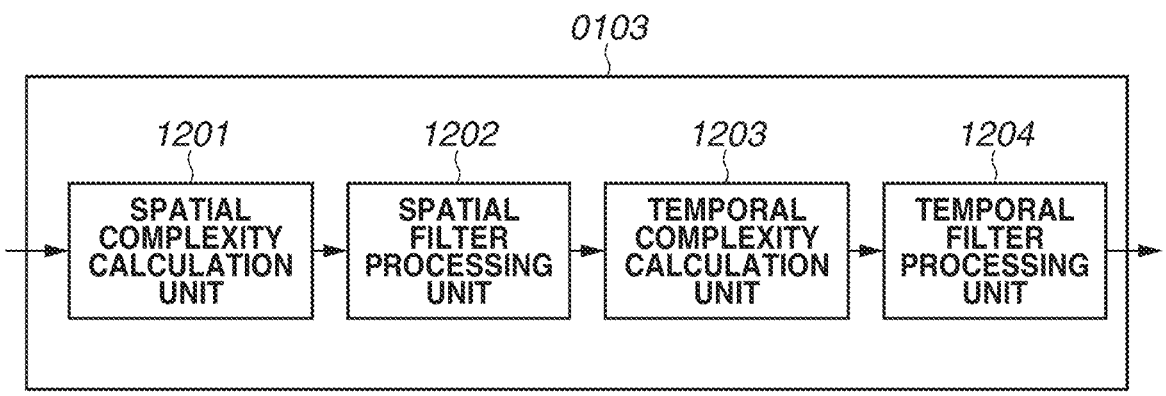
FIG. 12 is a block diagram illustrating an example of a detailed configuration of a multivalued volume generation unit according to a fourth embodiment.

The image processing apparatus 0100 according to the fourth embodiment will be described with reference to FIGS. 1 and 12. In the image processing apparatus 0100 according to the fourth embodiment (hereinafter simply referred to as the "image processing apparatus 0100"), first, a binary volume obtaining unit 0102 obtains a binary volume for each of a plurality of frames, and a spatial complexity calculation unit 1201 calculates the complexity in the spatial direction. Further, in the image processing apparatus 0100, a spatial filter processing unit 1202 performs filter processing in the spatial direction to convert the binary volume into multivalued data. Furthermore, in the image processing apparatus 0100, a temporal complexity calculation unit 1203 calculates the complexity in the temporal direction, and a temporal filter processing unit 1204 performs filter processing in the temporal direction to convert the binary volume into multivalued data.

The image processing apparatus 0100 includes a binary volume generation unit 0101, the binary volume obtaining unit 0102, a multivalued volume generation unit 0103, a the surface profile generation unit 0104, which are illustrated in FIG. 1. The multivalued volume generation unit 0103 according to the fourth embodiment includes the spatial complexity calculation unit 1201, the spatial filter processing unit 1202, the temporal complexity calculation unit 1203, and the temporal filter processing unit 1204, which are illustrated in FIG. 12.

The binary volume generation unit 0101, the binary volume obtaining unit 0102, and the surface profile generation unit 0104 according to the fourth embodiment are respectively similar to the binary volume generation unit 0101, the binary volume obtaining unit 0102, and the surface profile generation unit 0104 according to the third embodiment. Accordingly, the detailed descriptions thereof are omitted.

The spatial complexity calculation unit 1201 calculates the complexity in the spatial direction of a local area in the binary volume for each of the plurality of frames obtained by the binary volume obtaining unit 0102, like in the second embodiment.

The spatial filter processing unit 1202 performs Gaussian filter processing in the spatial direction on the binary volume for each frame by adaptively changing the filter parameter depending on the complexity in the spatial direction, thereby obtaining a multivalued volume for each of the plurality of frames.

The temporal complexity calculation unit 1203 calculates the complexity by calculating the sum of absolute differences between the voxel value of each voxel in the processed frame and the voxel value in another frame in the multivalued volume calculated by the spatial filter processing unit 1202.

The temporal filter processing unit 1204 performs Gaussian filter processing in the temporal direction on the multivalued volume by adaptively changing the filter parameter depending on the complexity in the temporal direction, thereby obtaining a spatiotemporally-smoothed multivalued volume.

An operation of the image processing apparatus 0100 will be described with reference to FIG. 3, FIG. 13, and FIGS. 14A to 14F.

Figure 13:
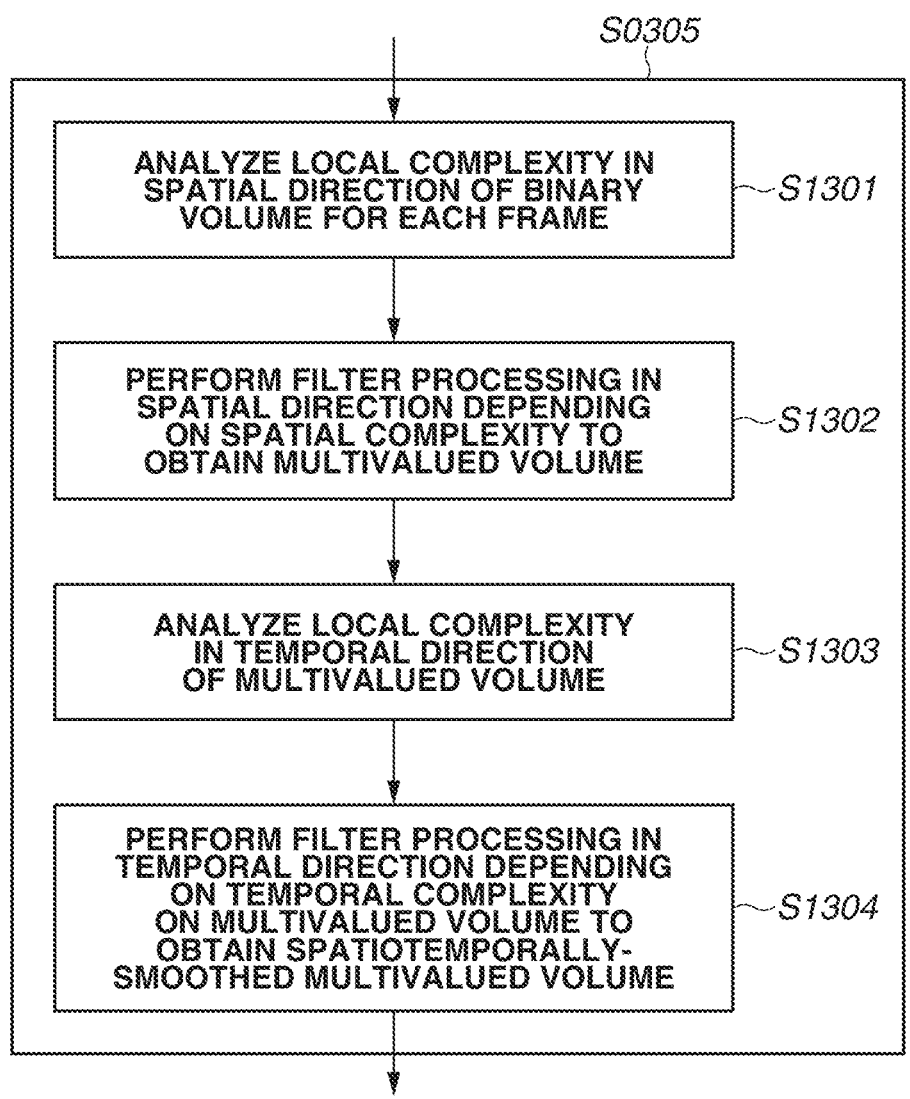
FIG. 13 is a flowchart illustrating an example of a flow of processing performed by an image processing apparatus according to the fourth embodiment.

A flowchart of processing performed by the image processing apparatus 0100 according to the fourth embodiment is illustrated in FIG. 3. The processing of steps S0301 to S0307 illustrated in FIG. 3, except the processing of step S0305, is similar to that in the first embodiment, and thus the detailed description of the processing other than step S0305 is omitted. FIG. 13 illustrates detailed processing of step S0305 in the flowchart illustrated in FIG. 3 to be performed by the image processing apparatus 0100 according to the fourth embodiment. FIGS. 14A to 14F each schematically illustrate a form of data in the processing to be performed by the image processing apparatus 0100 according to the fourth embodiment.

Figure 14A:
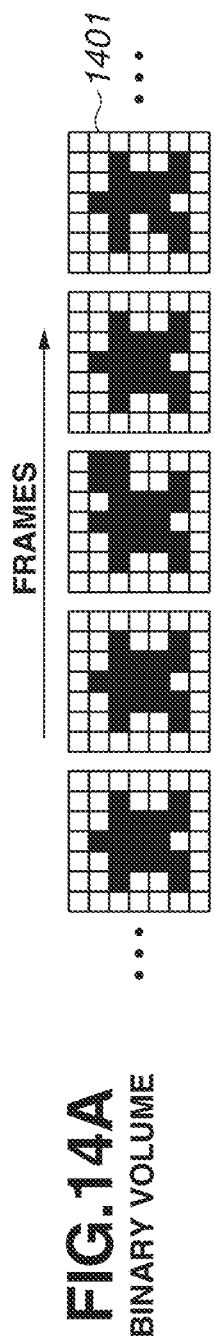
FIGS. 14A to 14F each schematically illustrate a form of geometric data that varies depending on processing in the flow of processing performed by the image processing apparatus according to the fourth embodiment.
Figure 14B:
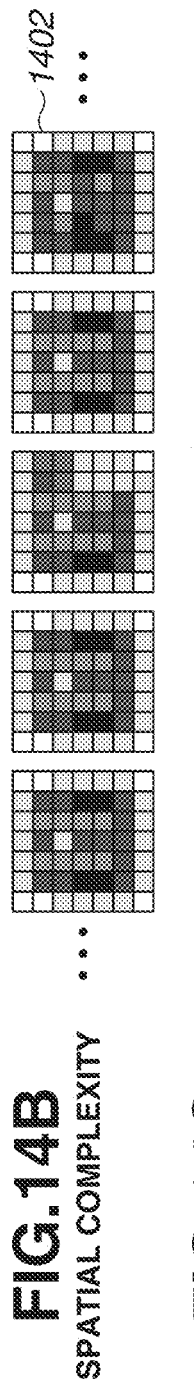

In step S1301, the spatial complexity calculation unit 1201 analyzes the complexity in the spatial direction, like in steps S0701 and S0702 according to the second embodiment, on a binary volume 1401 for each frame obtained in step S0304, and generates spatial complexity 1402. FIG. 14A schematically illustrates the binary volume 1401 obtained in step S0304. FIG. 14B schematically illustrates the spatial complexity 1402 generated in step S1301.

Figure 14C:
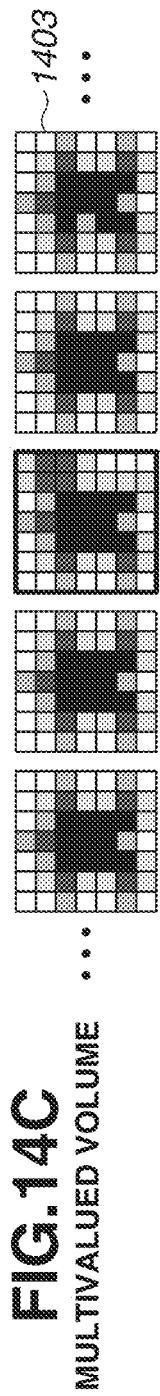

In step S1302, the spatial filter processing unit 1202 performs Gaussian filter processing in the spatial direction on the binary volume 1401 for each frame, like in step S0703 according to the second embodiment, and generates a multivalued volume 1403 illustrated in FIG. 14C. In this case, the Gaussian filter processing in the spatial direction is executed by adaptively changing the parameter based on the spatial complexity 1402.

Figure 14D:

In step S1303, the temporal complexity calculation unit 1203 calculates the sum of absolute differences between the voxel value in the processed frame and the voxel value in a neighboring frame for each voxel of the multivalued volume in a processed frame 1404 in a plurality of generated multivalued volumes 1403. The calculated sum of absolute differences corresponds to temporal complexity 1405. FIG. 14D schematically illustrates the temporal complexity 1405. In this case, the complexity is calculated from the multivalued volume by Equation (6).

Equation 6 can also be used to calculate complexity from the multivalued volume instead of the binary volume, and thus the complexity can be calculated by a method similar to that in the third embodiment. As described in the second embodiment, the sum of absolute differences between neighboring voxels may be used as the complexity, or frequency analysis may be performed and power of a specific frequency or frequency with high power may be used as the complexity.

Figure 14E:
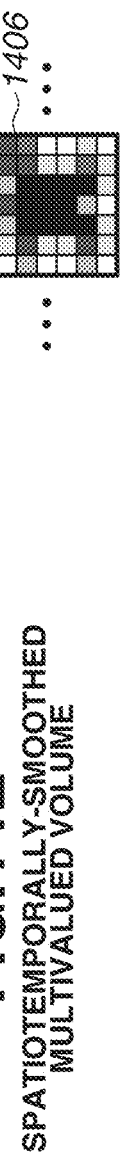

In step S1304, the temporal filter processing unit 1204 performs Gaussian filter processing in the temporal direction on the multivalued volume 1403, thereby generating a spatiotemporally-smoothed multivalued volume 1406 as illustrated in FIG. 14E. In this case, the Gaussian filter processing in the temporal direction is executed by adaptively changing the parameter based on the temporal complexity 1405. In the Gaussian filter processing, filter processing similar to that in the third embodiment can also be used for the multivalued volume.

Figure 14F:

In step S0306, the surface profile generation unit 0104 obtains a mesh model 1407 illustrated in FIG. 14F from the spatiotemporally-smoothed multivalued volume 1406. In step S0307, the surface profile generation unit 0104 outputs the mesh model 1407. The detailed description of the processing similar to that in the first embodiment is omitted.

The above-described processing enables the image processing apparatus 0100 to obtain the mesh model 1407 as the surface profile that spatially smoothly changes and temporally smoothly changes from the binary volumes 1401 of the plurality of frames.

In the fourth embodiment, the processing in the spatial direction is first performed, and then the processing in the temporal direction is performed. Alternatively, the processing in the temporal direction may be first performed, and the processing in the spatial direction may be performed.

The spatial complexity calculation unit 1201 and the temporal complexity calculation unit 1203 may be configured to perform spatial low-pass processing on the calculated complexity to convert the complexity into low-pass complexity, like in the complexity calculation unit 0601 according to Modified Example 1 of the third embodiment. In this case, the spatial filter processing unit 1202 and the temporal filter processing unit 1204 adaptively change the parameter for filter processing based on the low-pass complexity, like in Modified Example 1 of the third embodiment.

Figure 15:
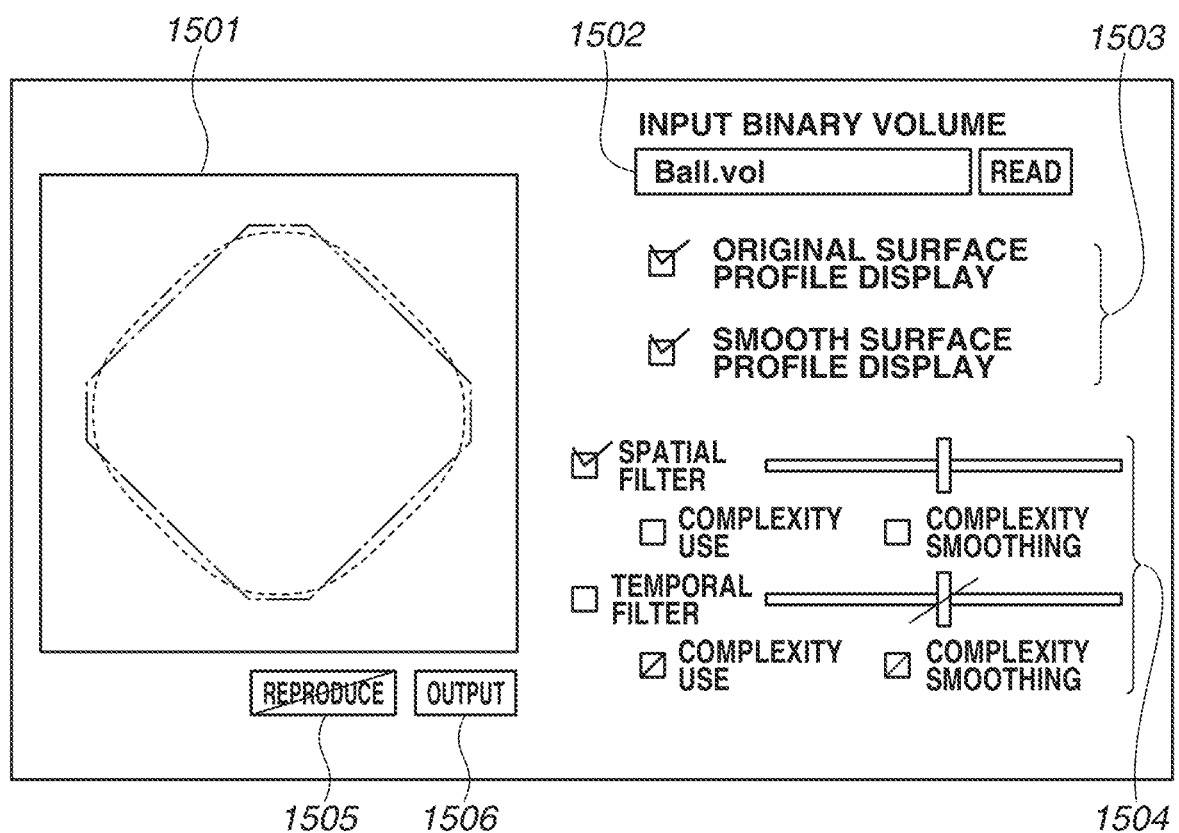
FIG. 15 illustrates an example of an operation user interface (UI).

FIG. 15 illustrates an example of an operation UI to be displayed on the display unit 0205. An image display area 1501 is an area on which a surface profile of an input volume or a rendering image of the surface profile is displayed. In this case, a two-dimensional surface profile is schematically displayed on the image display area 1501, but instead a three-dimensional surface profile may be displayed using shading. The operation UI illustrated in FIG. 15 is used in any of the first to fourth embodiments.

An input volume path setting area 1502 is an area on which a file path for the binary volume obtained by the binary volume obtaining unit 0102 is set. When a read button is pressed to read the file path in the input volume path setting area 1502, the processing of step S0304 in the flow of processing illustrated in FIG. 3 is executed. This volume information may be recorded on the ROM 0202 or the like. Alternatively, the communication unit 0207 may obtain the volume information from an external apparatus via communication.

A display information setting area 1503 is an area for the user to designate (set) the type of the surface profile to be displayed on the image display area 1501. A filter setting area 1504 is an area for the user to set whether to perform filter processing in the spatial direction and filter processing in the temporal direction, a filter parameter, whether to use the complexity, and whether to perform spatial smoothing on the complexity by a radio button operation and a slider operation. When the setting in the filter setting area 1504 is changed, the processing of step S0305 illustrated in FIG. 3 is executed and the surface profile generated based on the filter setting made by the user is generated. When a smoothed surface profile display in the display information setting area 1503 is turned on, the surface profile that is generated by processing of step S0306 illustrated in FIG. 3 from the multivalued volume calculated based on the filter setting on the filter setting area 1504 is displayed on the image display area 1501.

A reproduce button 1505 is a button UI for executing a function for continuously displaying surface profiles to be displayed on the image display area 1501 in an ascending order of frame number. This button UI enables the user to check a dynamic shape change of the generated surface profile. An output button 1506 is a button for storing the smooth surface profile generated based on the setting on the filter setting area 1504 in a file or memory, or outputting the generated smooth surface profile to another application. When the output button 1506 is pressed, the processing of step S0307 in the flow of processing illustrated in FIG. 3 is executed.

In this manner, the user can change the setting for smoothing processing while operating the UI and checking the smoothed surface profile and the surface profile before smoothing by referring to the surface profile displayed on the UI. This enables the user to easily create a desired smoothed surface profile.

Other Embodiments

In the first to fourth embodiments, the binary volume generation unit 0101 creates a binary volume from multi-view images, and the surface profile generation unit 0104 generates a mesh model by the marching cubes method. This is not intended to limit the input/output form, and any other input/output form can be used.

The binary volume generation unit 0101 can receive not only the captured multi-view images, but also other forms of data. As an example, a method for inputting a surface point group generated from a binary volume is described. In a case where the binary volume generation unit 0101 obtains a surface point group, data is divided by a voxel grid of the binary volume based on which the surface point group is obtained, and voxels which include the surface point group are set as ON-voxels. Then, a binary volume is created by setting voxels constituting the area surrounded by the ON-voxels as ON-voxels, and the created binary volume is output to the binary volume obtaining unit 0102. In particular, the volume of data to be held in the surface point group format is small, and thus this processing is effective when the binary volume is reduced in data size and stored.

If the user directly inputs the binary volume in any one of the first to fourth embodiments, the binary volume obtaining unit 0102 may directly obtain the binary volume from the user and start processing, without the processing to be performed by the binary volume generation unit 0101.

The surface profile generation unit 0104 can generate not only a mesh model, but also any other surface profile form. As an example, a method for generating a surface point group is described. First, the image processing apparatus 0100 sets a voxel of interest to be processed, and refers to neighboring voxels of the voxel of interest. Next, the image processing apparatus 0100 determines a pair of the voxel of interest and a neighboring voxel that satisfies the value of the voxel of interest≥threshold>the value of the neighboring voxel, or the value of the voxel of interest≤threshold<the value of the neighboring voxel. The image processing apparatus 0100 generates a vertex at a position corresponding to the threshold, assuming that the voxel values of the determined voxel pair are linearly changing between the voxel center coordinates of the voxel pair. The surface point group can be obtained by repeatedly performing the above-described processing.

Further, the method for generating a mesh model is not limited to the marching cubes method. As the method for generating a mesh model, a marching tetrahedra method, a dual contouring method, and the like may be used.

The present disclosure can also be implemented by processing in which a program for implementing one or more functions of the above-described embodiments is supplied to a system or apparatus via a network or storage medium, and one or more processors in a computer of the system or apparatus read out and execute the program.

The present disclosure can also be implemented by a circuit (e.g., an ASIC) for implementing one or more functions of the above-described embodiments.

Arbitrary combinations of the embodiments, arbitrary modifications of components in the embodiments, or arbitrary omissions of components in the embodiments can be made within the scope of the present disclosure.

The disclosure of the invention include one or more of the following configurations as well as, optionally, the following method. The following configurations as well as the method may set out one or more aspects of the invention, and may encompass the embodiments described herein.

Configuration 1

An image processing apparatus comprising:
an obtaining unit configured to obtain a binary volume;
a first generation unit configured to generate a multivalued volume by performing filter processing on the obtained binary volume; and
a second generation unit configured to generate a surface profile of a three-dimensional geometric model based on the generated multivalued volume.

Configuration 2

The image processing apparatus according to Configuration 1, wherein the multivalued volume is generated by performing filter processing in a spatial direction.

Configuration 3

The image processing apparatus according to Configuration 1 or 2,
wherein the obtaining unit obtains a binary volume for each of a plurality of frames, and
wherein the first generation unit performs filter processing in a temporal direction.

Configuration 4

The image processing apparatus according to any one of Configurations 1 to 3, further comprising:
a third generation unit configured to obtain a plurality of captured images captured from a plurality of viewpoints and generate the binary volume based on the plurality of captured images, wherein the obtaining unit obtains the binary volume generated by the third generation unit.

Configuration 5

The image processing apparatus according to any one of Configurations 1 to 4, wherein the first generation unit generates the multivalued volume by performing, as the filter processing, weighted average processing on each voxel of the binary volume and a neighboring voxel.

Configuration 6

The image processing apparatus according to any one of Configurations 1 to 5, wherein the first generation unit generates the multivalued volume by changing a voxel resolution as the filter processing.

Configuration 7

The image processing apparatus according to any one of Configurations 1 to 6, wherein the second generation unit determines a vertex position with reference to a voxel value of the multivalued volume such that the surface profile of the three-dimensional geometric model is generated with a higher resolution than a voxel resolution.

Configuration 8

The image processing apparatus according to Configuration 7, wherein the second generation unit performs object inside/outside determination processing on each voxel included in the multivalued volume to determine whether the voxel is inside an object, and generates the surface profile based on a pattern of a voxel determined to be inside the object and a pattern of a voxel determined to be outside the object.

Configuration 9

The image processing apparatus according to any one of Configurations 1 to 8, further comprising:
a complexity calculation unit configured to calculate, as complexity, a variation or a fluctuation frequency of a neighboring voxel value in a spatial direction or a temporal direction for each voxel included in the binary volume obtained by the obtaining unit, and
wherein the first generation unit locally changes a strength of a filter depending on the complexity.

Configuration 10

The image processing apparatus according to Configuration 9, wherein the complexity calculation unit calculates frequency information in the spatial direction or the temporal direction as the complexity.

Configuration 11

The image processing apparatus according to Configuration 9 or 10, wherein in a case where smoothing processing is performed as the filter processing, the first generation unit decreases a smoothing strength in the filter processing on a local area with high complexity.

Configuration 12

The image processing apparatus according to any one of Configurations 9 to 11,
wherein the complexity calculation unit calculates, as the complexity, data obtained by spatially performing low-pass processing on the variation or the fluctuation frequency of the neighboring voxel value, and
wherein the first generation unit performs the filter processing based on the complexity.

Method 13

A control method comprising:
obtaining a binary volume;
generating a multivalued volume by performing filter processing on the obtained binary volume; and
generating a surface profile of a three-dimensional geometric model based on the generated multivalued volume.

Storage Medium 14

A non-transitory storage medium storing a program for causing an image processing apparatus to execute a control method, the control method comprising:
obtaining a binary volume;
generating, as a first generation, a multivalued volume by performing filter processing on the obtained binary volume; and
generating, as a second generation, a surface profile of a three-dimensional geometric model based on the generated multivalued volume.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions obvious to the skilled person in light of their common general knowledge.

This application claims the benefit of Japanese Patent Application No. 2022-140386, filed Sep. 2, 2022, which is hereby incorporated by reference herein in its entirety.

What is claimed is:

1. An image processing apparatus comprising:
at least one memory configured to store instructions; and
at least one processor configured to execute the stored instructions, wherein the executed instructions are configured to:
obtain a binary volume;
calculate, as complexity, a variation or a fluctuation frequency of a neighboring voxel value in a temporal direction for each voxel included in the obtained binary volume;
generate a multivalued volume by performing filter processing on the obtained binary volume based on the complexity; and
generate a surface profile of a three-dimensional geometric model based on the generated multivalued volume.

2. The image processing apparatus according to claim 1, wherein the multivalued volume is generated by performing filter processing in a spatial direction.

3. The image processing apparatus according to claim 1, wherein the or each processor is further configured to execute the instructions to:
obtain a binary volume for each of a plurality of frames, and
wherein the multivalued volume is generated by performing filter processing in a temporal direction.

4. The image processing apparatus according to claim 1, wherein the or each processor is further configured to execute the instructions to:
obtain a plurality of captured images captured from a plurality of viewpoints and generate the binary volume based on the plurality of captured images.

5. The image processing apparatus according to claim 1, wherein the multivalued volume is generated by performing, as the filter processing, weighted average processing on each voxel of the binary volume and a neighboring voxel.

6. The image processing apparatus according to claim 1, wherein the multivalued volume is generated by changing a voxel resolution as the filter processing.

7. The image processing apparatus according to claim 1, wherein a vertex position is determined with reference to a voxel value of the multivalued volume such that the surface profile of the three-dimensional geometric model is generated with a higher resolution than a voxel resolution.

8. The image processing apparatus according to claim 7, wherein the or each processor is further configured to execute the instructions to:
perform object inside/outside determination processing on each voxel included in the multivalued volume to determine whether the voxel is inside an object, and
wherein the surface profile is generated based on a pattern of a voxel determined to be inside the object and a pattern of a voxel determined to be outside the object.

9. The image processing apparatus according to claim 1, wherein the or each processor is further configured to execute the instructions to:
calculate, as the complexity, the variation or the fluctuation frequency of a neighboring voxel value in a spatial direction for each voxel included in the obtained binary volume, and
wherein a strength of a filter is locally changed depending on the complexity.

10. The image processing apparatus according to claim 9, wherein frequency information in the spatial direction is calculated as the complexity.

11. The image processing apparatus according to claim 1, wherein in a case where smoothing processing is performed as the filter processing, a smoothing strength is decreased in the filter processing on a local area with high complexity.

12. The image processing apparatus according to claim 9, wherein the complexity is data obtained by spatially performing low-pass processing on the variation or the fluctuation frequency of the neighboring voxel value, and
wherein the filter processing is performed based on the complexity.

13. The image processing apparatus according to claim 1, wherein frequency information in the temporal direction is calculated as the complexity.

14. A control method for an image processing apparatus, comprising:
obtaining a binary volume;
calculating, as complexity, a variation or a fluctuation frequency of a neighboring voxel value in a temporal direction for each voxel included in the obtained binary volume;
generating, as a first generation, a multivalued volume by performing filter processing on the obtained binary volume based on the complexity; and
generating, as a second generation, a surface profile of a three-dimensional geometric model based on the generated multivalued volume.

15. A non-transitory storage medium storing a program configured to cause an image processing apparatus to execute a control method, the control method comprising:
obtaining a binary volume;
calculating, as complexity, a variation or a fluctuation frequency of a neighboring voxel value in a temporal direction for each voxel included in the obtained binary volume;
generating, as a first generation, a multivalued volume by performing filter processing on the obtained binary volume based on the complexity; and
generating, as a second generation, a surface profile of a three-dimensional geometric model based on the generated multivalued volume.

* * * * *